Dec. 6, 1927. Re. 16,812
F. R. STARK
VENTILATOR
Original Filed Sept. 21, 1923
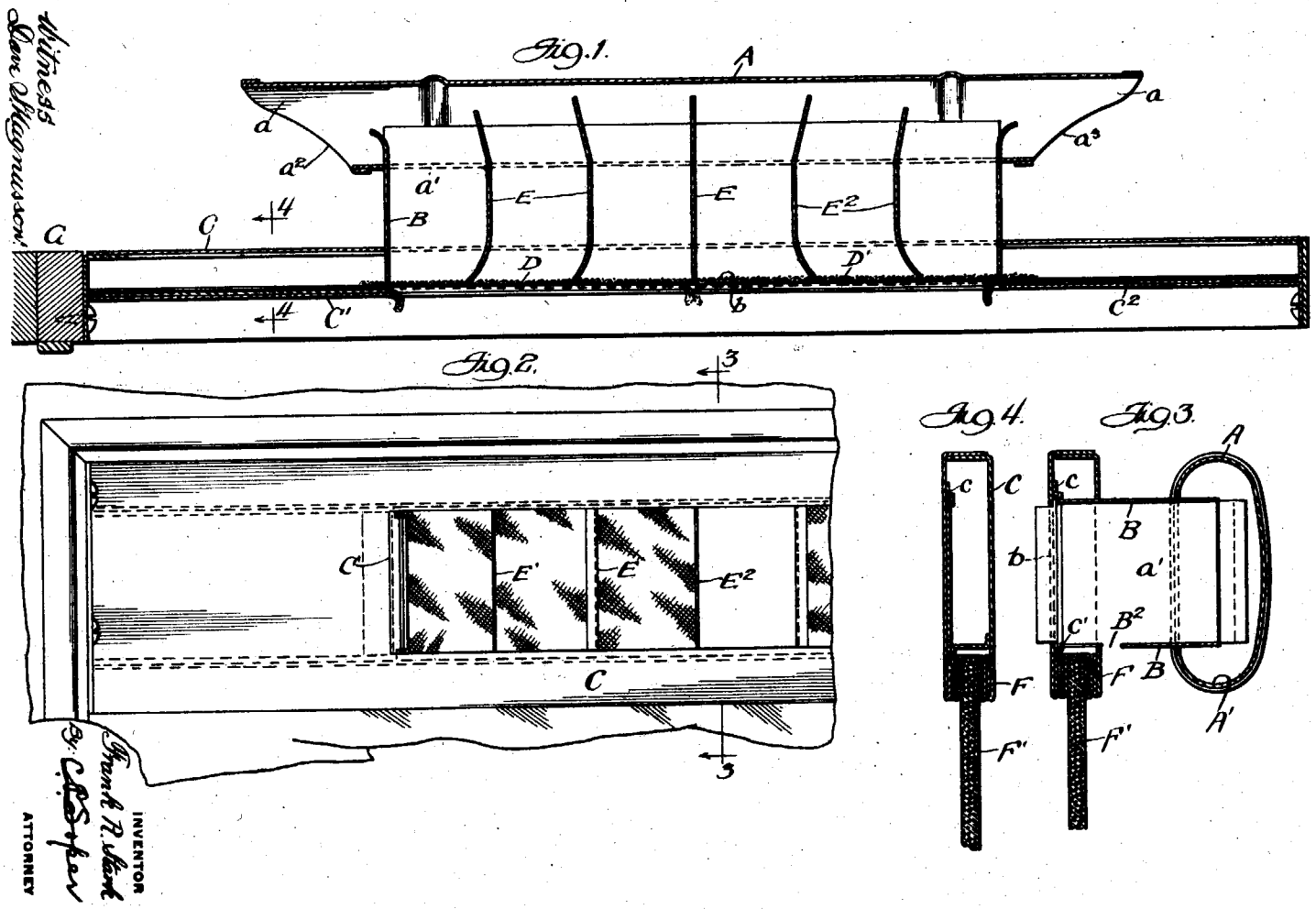

Reissued Dec. 6, 1927.

Re. 16,812

UNITED STATES PATENT OFFICE.

FRANK R. STARK, OF CHICAGO, ILLINOIS.

VENTILATOR.

Original No. 1,605,080, dated November 2, 1926, Serial No. 663,940, filed September 21, 1923. Application for reissue filed October 20, 1927. Serial No. 227,597.

My invention relates to ventilators of the class used in motor vehicles, trains and the like and is designed particularly with reference to supplying fresh air within the enclosure and at the same time to draw impure air therefrom.

It is also an object of my invention to provide mechanism for screening the incoming air which has been found particularly desirable when the device is used in train service, also to provide means for adjusting the size of the opening controlling the inlet of fresh air, and to so arrange the device that this adjustment may easily be made by the occupant of the car.

These and other objects of my invention which will be apparent to those skilled in the art, are set forth in the following description and claims.

In the accompanying drawings, I have illustrated what I now consider an embodiment of the essential features of my invention and in these drawings:—

Fig. 1 is a longitudinal plan section of the ventilator.

Fig. 2 illustrates in elevation a section of the ventilator applied to car.

Fig. 3 is a transverse section taken on line 3—3 of Fig. 2, and

Fig. 4 is a similar section taken on line 4—4 of Fig. 1.

Referring to the drawings, A represents a casing forming an air duct or channel which is preferably tubular and open at both ends. The ends of this casing are preferably cut upon an angle diagonal to the axis thereof with the long sides of the tubes upon the outside as shown at *a*—*a*, to facilitate the passage of air through the channel.

Upon the inside, or what I shall designate the short side *a'* of the channel, I provide an opening by cutting a slot lengthwise of the channel casing and bending the sides thereof at right angles, or cutting the bent portion out entirely, to form a central longitudinal opening into the air channel casing A. Fitted into this opening is a longitudinally extending casing B, having two sides and end walls closed and the two opposite sides open, one of which extends into the aforesaid opening formed in the air channel casing.

This casing B forms an airway having open communication with the tubular channel A into which fresh air enters through the end openings thereof and finds its way into the interior of the car.

A supporting frame member C receives one side of the casing B, thereof. This supporting frame is provided with an opening extending through the longitudinal center thereof, one side of said opening receiving the casing B, which is referred to and the opposite side *b* opening into the interior of the car.

Sliding doors C'—C² are provided to close the opening *b*. These sliding doors are held in guideways formed by the clips C—C', suitably attached to the supporting frame member C.

Screens D—D' are secured to the casing B extending over the opening through said frame to the inside of the car. These screens are preferably of fine mesh to prevent flying dust particles and the like from passing through the window to the interior of the car.

Extending transversely of the casing B are a plurality of stationary partition walls, the central partition E being straight and positioned mediate the length of said casing. This partition E is secured at the edges thereof to the side wall of the casing B, the lower edge of said partition meeting the center of the screen covering D over the inlet air passageway and the screen D' covering the outlet air passageway.

Arranged upon opposite sides of this central partition E are other partition or dividing walls E'—E², the side edges of which are also secured to the wall of the casing B. The partitions E'—E² are curved from end to end thereof, forming a concavo-convex wall curving from end to end thereof, the concave side of each of said walls E'—E² being turned toward the open ends of the casing A, forming an air channel therethrough.

It will be observed that these curved walls extend at the bottom thereof to the screens D—D' above the sides of the wall of the casing B, but not in contact with the wall forming the air channel casing A. These partition walls extend at different lengths from the screen through the casing toward the wall of the tubular member A, and form deflectors or guides for the air currents passing into or out of the car. The curve on the lower end of each partition E′—E² will cause an air current or eddy to form in each compartment between the partitions and casing B, causing any dust or small particles flying in the air to be deflected into the lowermost part A′ of the air channel or casing A. The current of air passing directly through said channel A when the vehicle is moving will carry any dust or flying particles through the channel to atmosphere.

The supporting frame C is provided with a longitudinally extending recess upon one side thereof which is lined with felt or other more or less flexible material F, which recess when the device is placed in position receives the glass F′ forming the window of the car, or it may receive a frame holding said glass in the window as one which is set in a frame.

G is a section of the frame or window sash within which the ventilator is placed.

When the device is assembled and placed in position, the screen openings are upon the interior of the car. These openings may be closed by drawing the sliding doors C′—C² together in the position shown in dotted lines in Fig. 1. When a circulation of air is desired in the car, the doors C′—C² are opened, fresh air is drawn into the air channel A, through the end of the ventilator extending in the direction of travel of the car and as the air current passes through the opening $a^2$ or $a^3$, it strikes the partitions E′—E² in said channel and is deflected toward and through the screen openings into the car; any dust or cinders entering the air channel will strike the partitions E′—E² and fall to the bottom of the casing B, and out through the opening B².

The screen opening extending toward the rear of the car in the direction of its travel, permits the air within the car to pass out through said screen opening and between the partition E′ or E² into the air channel A and out to atmosphere at the rear of the ventilator.

It will be seen that I have provided a ventilator which is in one compact structure, the inlet and exhaust opening automatically operating though the car is moving forward or backward; and the means for regulating the size of the inlet and exhaust openings is positioned within the inside of the car making convenient for the occupant to open or close the same as desired.

I have also shown and described a ventilator provided with a plurality of partitions spaced apart in the casing between the air channel and supporting member, but I contemplate the use of a ventilator having but one central partition E, the incoming air being diverted from said partition through the opening into the interior of the car and the impure air from the car exhausting through the opening upon the opposite side of the partition.

I claim:—

1. In a ventilator for a closed vehicle, the combination of a tubular casing open at both ends and having an opening along one side thereof, a hollow supporting frame joined to said casing about the said opening, said supporting frame being of a size snugly to fit within the window opening of the vehicle and provided with an opening communicating with the interior of the structure to be ventilated, the edge of said frame being provided with a padded channel within which the edge of the window is received, a plurality of stationary partitions carried by said supporting frame and extending into said casing, and adjustable closure plates for controlling the size of the last mentioned opening.

2. In a ventilator for a closed vehicle, the combination of a tubular casing open at both ends and having an opening along one side thereof, a hollow supporting frame joined to said casing about the said opening, said supporting frame being of a size snugly to fit within the opening of the vehicle and provided with an opening communicating with the interior of the structure to be ventilated, the edge of said frame being provided with resilient means arranged to receive the edge of the window, a plurality of stationary partitions carried by said supporting frame and extending into said casing and adjustable closure plates for controlling the size of the last mentioned opening 3. A vehicle ventilator comprising a tubular vehicle casing open at its ends and having an opening along one side, a supporting frame of a size snugly to fit within the window opening of a vehicle and provided with an opening, a tubular member having imperforate side walls joining said casing to said frame and having its opposite ends positioned within the opening of said casing and said frame respectively, a plurality of partitions within the tubular member and extending into the casing but stopping short of the outer side to leave an opening for the flow of air thereby, and an adjustable closure carried by the frame for closing the opening in the frame.

4. A vehicle ventilator comprising a tubular casing open at both ends and having an opening along one side thereof, a supporting frame of a size snugly to fit within an opening of a vehicle and provided with an opening, imperforate means joining the edge of the respective openings of said casing and frame together, of a plurality of stationary partitions within the said tubular casing and extending a major distance there across but arranged to leave an opening for the passage of air thereby, and an adjustable closure carried by said frame for controlling the passage of air therethrough.

5. A vehicle ventilator comprising a tubular casing open at its ends and having an opening along one side, a supporting frame of a size snugly to fit within the window opening of a vehicle and provided with an opening, a tubular member joining said casing to said frame and having its opposite ends positioned within the openings of said casing and said frame respectively, a plurality of partitions within the tubular member and extending into the casing, the partitions adjacent to the ends of the casing extending into the casing a less distance than the intermediate partitions, said partitions being arranged to leave an opening for the flow of air thereby, and an adjustable closure carried by the frame for controlling the size of the opening in the frame.

6. A vehicle ventilator comprising a tubular casing open at both ends and having an opening along one side thereof, a supporting frame of a size snugly to fit within the window opening of a vehicle and constructed to permit passage of the air through said frame, imperforate means joining the edge of the opening in the tubular casing with said frame, a plurality of stationary air deflecting partitions within the said tubular casing and extending only part way across the same leaving a passage for air at the outer side of the casing, and an adjustable closure carried by said frame for controlling the passage of air therethrough.

7. In a ventilator, a tubular casing open at both ends and having an opening along one side thereof, a supporting frame member therefor having an opening therein similar to and substantially alined with the opening in the casing, a hollow member joining said casing to said frame and having imperforate side walls, a stationary partition mounted to divide the opening in said frame into two similar parts and projecting into said casing, but arranged to permit the passage of air thereby and a closure plate arranged to control the size of the frame opening.

8. A vehicle ventilator comprising a tubular casing open at its ends and having an opening along one side, a supporting frame of a size snugly to fit within an opening of a vehicle and provided with an opening, a tubular member having imperforate side walls joining said casing to said frame and having its opposite ends positioned within the openings of said casing and said frame respectively, a stationary partition within the tubular member and extending a major distance across the casing but arranged to leave an opening for the flow of air thereby, and an adjustable closure carried by the frame for controlling the size of the opening in the frame.

9. In a ventilator for a closed vehicle, the combination of tubular casing open at both ends and having an opening along one side thereof, a hollow supporting frame joined to said casing about the said opening, said supporting frame being of a size snugly to fit within the window opening of the vehicle and provided with an opening communicating with the interior of the structure to be ventilated, an edge of said frame being provided with a resilient recess within which the edge of the window is received, a stationary partition carried by said supporting frame and extending into said casing intermediate the ends thereof and adjustable closure plates for controlling the size of the last mentioned opening.

In testimony whereof I have signed this specification.

FRANK R. STARK.